US012609361B2

(12) United States Patent
Nishimura

(10) Patent No.: US 12,609,361 B2
(45) Date of Patent: Apr. 21, 2026

(54) POWER STORAGE ELEMENT AND METHOD FOR MANUFACTURING SAME

(71) Applicant: KAWASAKI MOTORS, LTD., Hyogo (JP)

(72) Inventor: Kazuya Nishimura, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 787 days.

(21) Appl. No.: 17/863,732

(22) Filed: Jul. 13, 2022

(65) Prior Publication Data

US 2022/0352556 A1 Nov. 3, 2022

Related U.S. Application Data

(63) Continuation of application No. PCT/JP2020/001340, filed on Jan. 16, 2020.

(51) Int. Cl.
*H01M 10/0587* (2010.01)
*H01M 4/04* (2006.01)
(Continued)

(52) U.S. Cl.
CPC ..... *H01M 10/0587* (2013.01); *H01M 4/0435* (2013.01); *H01M 10/045* (2013.01); *H01M 50/533* (2021.01); *H01M 50/538* (2021.01)

(58) Field of Classification Search
None
See application file for complete search history.

(56) References Cited

U.S. PATENT DOCUMENTS

| | | | | | |
|---|---|---|---|---|---|
| 2012/0282504 | A1* | 11/2012 | Kim | ..................... | H01M 50/169 |
| | | | | | 429/82 |
| 2013/0330585 | A1* | 12/2013 | Utterman | ............ | H01M 50/105 |
| | | | | | 29/623.2 |
| 2017/0214094 | A1* | 7/2017 | Ryu | .................... | H01M 50/105 |

FOREIGN PATENT DOCUMENTS

| | | |
|---|---|---|
| JP | 2018-206575 | 12/2018 |
| JP | 2018206575 A | * 12/2018 |
| KR | 2016-0004737 | 1/2016 |

OTHER PUBLICATIONS

Doyoyo et al., "Pressure Vessels With Reinforcing Space-Filling Skeletons", Journal of Pressure Vessel Technology 130(3), 031210, Aug. 2008 (Year: 2008).*

(Continued)

*Primary Examiner* — Niki Bakhtiari
*Assistant Examiner* — James A Corno
(74) *Attorney, Agent, or Firm* — Greenblum & Bernstein, P.L.C.

(57) ABSTRACT

Provided is a power storage element including: an outer collector including outer opposing walls facing each other with a gap therebetween in an opposition direction, an inner collector including inner opposing walls, and an electrode member disposed in a space defined between the opposing walls. The electrode member includes: an electrode laminate having a sheet-like shape and including a positive electrode body, a negative electrode body, and a separator interposed between the positive and negative electrode bodies. The electrode laminate forms a plurality of unit electrode layers laminated in a lamination direction perpendicular to the opposition direction, and adjacent unit electrode layers in the lamination direction are continued in a bending manner at end portions of the unit electrode layers in an extension direction. The positive electrode body and the negative electrode body are in contact with a first collector and a (Continued)

second collector, respectively, to be electrically connected thereto.

16 Claims, 8 Drawing Sheets

(51) Int. Cl.
H01M 10/04 (2006.01)
H01M 50/533 (2021.01)
H01M 50/538 (2021.01)

(56) References Cited

OTHER PUBLICATIONS

"The advantages and disadvantages of different battery cell types", AMPOW blog, https://blog.ampow.com/the-advantages-and-disadvantages-of-different-battery-cell-types/, Aug. 2019, retrieved Feb. 26, 2025 (Year: 2019).*
Yao et al. "Tab Design and Failures in Cylindrical Li-ion Batteries", IEEE Access vol. 7, pp. 24082-24095, Feb. 2019 (Year: 2019).*

* cited by examiner

Fig. 10

POWER STORAGE ELEMENT AND METHOD FOR MANUFACTURING SAME

CROSS REFERENCE TO THE RELATED APPLICATION

This application is a continuation application, under 35 U.S.C. § 111(a), of international application No. PCT/JP2020/001340, filed Jan. 16, 2020, the entire disclosures of all of which are herein incorporated by reference as a part of this application.

BACKGROUND OF THE INVENTION

Field of the Invention

The present invention relates to a structure of a power storage element and a method for manufacturing the same.

Description of Related Art

In a proposed structure of a power storage element (for example, battery structure), a doughnut-like electrode member having a laminated structure is disposed between respective collectors of a positive electrode and a negative electrode arranged inside and outside in a double cylindrical structure (see Patent Document 1).

RELATED DOCUMENT

Patent Document

[Patent Document 1] JP Laid-open Patent Publication No. 2018-206575

SUMMARY OF THE INVENTION

In the battery disclosed in Patent Document 1, an electrode member is constituted by multiple layers including positive electrode bodies, negative electrode bodies and separators each having a doughnut-like sheet shape. This requires steps of cutting out these sheet bodies from a base sheet as a base material and arranging these sheet bodies in a layered structure. In addition, it is necessary to provide the cut doughnut-shaped sheets depending on the number of layers to be laminated. Further, for example, manually lamination of the cut sheet bodies requires considerable labor and time. For these reasons, it is difficult to increase the number of electrode members that can be manufactured per unit time.

In order to solve the above problem, an object of the present invention is to increase the number of electrode members that can be manufactured per unit time.

In order to achieve the above object, a power storage element according to the present invention includes:

a pair of outer collectors facing each other with a gap therebetween in a predefined opposition direction, a pair of inner collectors disposed on an inner side with respect to the pair of outer collectors in the opposition direction and facing each other with a gap therebetween in the opposition direction, and an electrode member disposed in a space defined between the pair of outer collectors and the pair of inner collectors, wherein the electrode member includes:

a plurality of unit electrode layers laminated in a predefined lamination direction perpendicular to the opposition direction, each of the unit electrode layers having a sheet-like shape and including a positive electrode body, a negative electrode body, and a separator interposed between the positive electrode body and the negative electrode body, and adjacent unit electrode layers in the lamination direction are continued in a bending manner at end portions of the unit electrode layers in an extension direction perpendicular to the opposition direction and the lamination direction, respective positive electrode bodies constituting the unit electrode layers are in contact with first collectors, which are one of the pair of outer collectors and the pair of inner collectors, to be electrically connected to the first collectors, and respective negative electrode bodies constituting the unit electrode layers are in contact with second collectors, which are the other of the pair of outer collectors and the pair of inner collectors, to be electrically connected to the second collectors.

According to this constitution, the electrode member can be formed in a bending structure in which the unit electrode layers continuously extend at the end portions in the extension direction so as to achieve a laminated structure including the plurality of unit electrode layers. This eliminates the necessity of cutting a sheet body depending on the number of the unit electrode layers, so that it is possible to reduce the number of components in assemblage of the power storage element. Further, this does not require operations of cutting sheet bodies and arranging the cut sheet bodies in a layered structure, so that the number of operations can be reduced. In this way, it is possible to increase the number of electrode members that can be manufactured per unit time.

In the power storage element according to one embodiment of the present invention, an electrode laminate having a sheet-like shape is wound or folded such that the electrode laminate is bent at opposite end portions thereof in the extension direction to form the plurality of unit electrode layers. According to this constitution, a single sheet body can be formed into three or more unit electrode layers arranged in the lamination direction, making it possible to reduce the number of components and the number of operations.

In the power storage element according to one embodiment of the present invention, at least one of the positive electrode body and the negative electrode body constituting each unit electrode layer may be in contact with both of a pair of opposing walls in the opposition direction to be electrically connected to a corresponding collector. According to this constitution, both of the pair of opposing walls can function as collectors so as to shorten a distance which electrons move from the negative electrode to the positive electrode in the electrode member and thereby reduce internal resistance of the power storage element.

In the power storage element according to one embodiment of the present invention, the unit electrode layers of the electrode member may include parts having a same dimension in the opposition direction over a predetermined range in the extension direction. According to this constitution, the parts having a same dimension in the opposition direction can make the end faces in the opposition direction linear. This facilitates line contact of the electrode member with the opposing walls and thus can suppress contact failure between the electrode member and the collectors. For example, the adjacent unit electrode layers in the lamination direction include parts having a same dimension in the opposition direction, so that the end faces of the collectors in the opposition direction can be made flat. This facilitates surface contact of the electrode member with the opposing walls and can further suppress contact failure between the electrode member and the collectors.

In the power storage element according to one embodiment of the present invention, each of the unit electrode layers of the electrode member may have a rectangular shape with the sides extending in the extension direction and in the opposition direction when viewed in the lamination direction. According to this constitution, a density per unit space can be increased as compared with a case where each unit electrode layer has a circular shape when viewed in the lamination direction.

In the power storage element according to one embodiment of the present invention, a through hole may be shaped as an elongated hole along the extension direction perpendicular to the opposition direction and the lamination direction. According to this constitution, the elongated through hole makes it easy to provide longer inner contact surfaces than those in a case of a circular through hole, so that internal resistance of the power storage element can be reduced.

In the power storage element according to one embodiment of the present invention, the through hole may have a larger length in the extension direction than a length of an inner opposing walls in the extension direction. According to this constitution, it is possible to secure a margin for reliably achieving contact with the inner opposing walls against positional displacement occurring in the through hole when the electrode member is bent and thereby to prevent contact failure between the electrode member and the inner opposing walls.

In the power storage element according to one embodiment of the present invention, at least one of an outer opposing walls and the inner opposing walls may include irregularities which prevent positional displacement of the electrode member in contact therewith. According to this constitution, it is possible to prevent contact failure between the electrode member and the opposing walls and to prevent deterioration in collection efficiency.

In the power storage element according to one embodiment of the present invention, at least one of the outer collectors and the inner collectors may include a reinforcing mechanism which prevents deformation in the opposition direction. This constitution can prevent deformation of the collectors and thereby prevent contact failure between the positive and negative electrode bodies and the opposing walls and deterioration in collection efficiency.

A power storage element module according to the present invention is a power storage element module including a plurality of power storage elements according to any of the above constitutions, the power storage elements connected in series, wherein the power storage element module includes a connected collector unit including an outer collector of a first power storage element integrally formed with an inner collector of a second power storage element, the first and second power storage elements being adjacent in the lamination direction, and the connected collector unit has a connection structure in which the first and second power storage elements adjacent in the lamination direction are connected in a fitted manner. This constitution can eliminate a member or a step for connecting in series the above power storage elements which can reduce the manufacturing cost, achieving further reduction in the cost for the power storage element module.

An electrode member according to the present invention is an electrode member including a positive electrode body, a negative electrode body, and a separator interposed between the positive electrode body and the negative electrode body, the positive electrode body, the negative electrode body, and the separator forming a plurality of unit electrode layers laminated in a predefined lamination direction, wherein the electrode member includes:

two extension parts extending in a predefined extension direction and laminated in the predefined lamination direction, and a bending part connected to respective one end portions of the two extension parts in the extension direction and continuously extending in a bent manner such that, as the bending part extends from a first extension part toward one side in the extension direction, the bending part is folded toward the other side in the extension direction to be connected to a second extension part, the electrode member includes a through hole in the lamination direction, and the electrode member includes an outwardly exposed surface that is exposed on an outer side in an opposition direction perpendicular to the extension direction and the lamination direction to be electrically connected to a collector and an inwardly exposed surface that faces the through hole and is exposed on an inner side in the opposition direction to be electrically connected to a collector.

This electrode member can reduce the number of components in the laminated structure including multiple layers and simplify the manufacturing operations. This can also reduce the manufacturing cost for a power storage element including this electrode member.

A method of manufacturing a power storage element according to the present invention includes:

providing sheets of a positive electrode body, a negative electrode body, and two separators;

laminating the sheets to form a strip-like electrode laminate including a unit electrode layer in which one of the positive electrode body and the negative electrode body is arranged between the two separators, and the other of the positive electrode body and the negative electrode body is arranged on an outer side of one of the two separators;

winding the electrode laminate in an extension direction of the electrode laminate to form an electrode member including a plurality of unit electrode layers laminated in a lamination direction;

setting a positive electrode-body exposing edge part and a negative electrode-body exposing edge part in the positive electrode body and the negative electrode body, respectively, wherein the positive electrode-body exposing edge part and the negative electrode-body exposing edge part are exposed from the electrode member in an opposition direction perpendicular to the lamination direction and the extension direction;

providing an outer collector including a pair of outer opposing walls facing each other with a gap therebetween and an inner collector disposed on an inner side with respect to the pair of outer opposing walls and including a pair of inner opposing walls facing each other with a gap therebetween in the opposition direction of the pair of outer opposing walls; and assembling the power storage element such that the positive electrode-body exposing edge part is placed in contact with one of the pair of outer opposing walls and the pair of inner opposing walls as collecting walls, and the negative electrode-body exposing edge part is placed in contact with the other of the pair of outer opposing walls and the pair of inner opposing walls as collecting walls to put together the electrode member, the outer collector, and the inner collector.

According to this constitution, the electrode member is formed in a bending structure in which the unit electrode layers continuously extend at the end portions in the extension direction so as to achieve a laminated structure including the plurality of unit electrode layers. This eliminates the necessity of cutting sheet bodies depending on the number of the unit electrode layers, so that it is possible to reduce the number of components in assemblage of the power storage element. Further, this does not require operations of cutting sheet bodies and arranging the cut sheet bodies in a layered structure, so that the number of operations can be reduced.

In the manufacturing method according to one embodiment of the present invention, the setting the exposing edge parts may include exposure processing to the positive electrode body, the negative electrode body and the separators or to the electrode laminate so as to form the positive electrode-body exposing edge part and the negative electrode-body exposing edge part before the winding. According to this constitution, it is not necessary to form the exposing edge parts after the winding. That is, this constitution makes it possible to avoid winding displacement, i.e., positional displacement in the constituting layers, which can often be caused by processing to the electrode member after the winding.

In the manufacturing method according to one embodiment of the present invention, the exposure processing may include slit processing to form a slit penetrating, in a thickness direction, the positive electrode body, the negative electrode body and the separators or the electrode laminate at inner positions in a widthwise direction thereof, and the providing the sheets may include positive electrode application to apply a positive electrode active material to a positive electrode metal substrate and negative electrode application to apply a negative electrode active material to a negative electrode metal substrate, and the positive electrode application and the negative electrode application include continuously applying the positive electrode active material and the negative electrode active material, respectively, in the extension direction to a non-slit area excluding a slit area where the slit is to be formed in the slit processing.

According to this constitution, the positive and negative electrode active materials are continuously applied to the non-slit area of the electrode laminate at a step of providing the sheets, so that the time required for manufacturing the electrode body can be shortened as compared with the case where the respective active materials are applied to each of the cut sheets of the unit collectors.

In the manufacturing method according to one embodiment of the present invention, the slit processing may be carried out after the positive electrode application and the negative electrode application. According to this constitution, the slit can be more easily positioned because the active materials have already been applied to the non-slit area of the respective metal substrates when the slit processing is performed. In addition, the metal substrates can be more easily retained during the slit processing because the active materials increase the strength of the substrates. Thus, the slit processing can be effectively performed.

In the manufacturing method according to one embodiment of the present invention, the slit processing may include forming a slit in each of the positive electrode body, the negative electrode body, and the separators during the providing the sheets, and the providing the sheets may include forming the slit having a larger widthwise dimension in one of the positive electrode body and the negative electrode body than a widthwise dimension of the slit in the other of the positive electrode body and the negative electrode body, and making a widthwise dimension of the other of the positive electrode body and the negative electrode body larger than a widthwise dimension of the one of the positive electrode body and the negative electrode body. According to this constitution, the exposing edge parts can be easily formed after the winding, so that processing to the electrode member after the winding can be omitted or simplified.

In the manufacturing method according to one embodiment of the present invention, the providing the sheets may include rolling at least one of the positive electrode body and the negative electrode body, and the setting the exposing edge parts may include setting, in the rolled positive electrode body and/or the rolled negative electrode body, the positive electrode-body exposing edge part and/or the negative electrode-body exposing edge part so as to extend along a direction perpendicular to a rolling direction. According to this constitution, it is possible to reduce the influence of the rolling, such as cracks on the surfaces of the positive electrode body and the negative electrode body and increase in resistance.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures.

FIG. 10 is a plan view schematically showing one variant of an electrode member used in the power storage element of FIG. 1.

DESCRIPTION OF THE EMBODIMENTS

Hereinafter, an embodiment according to the present invention will be described with reference to the drawings. The present invention, however, is not intended to be limited to this embodiment.

Figure 1:
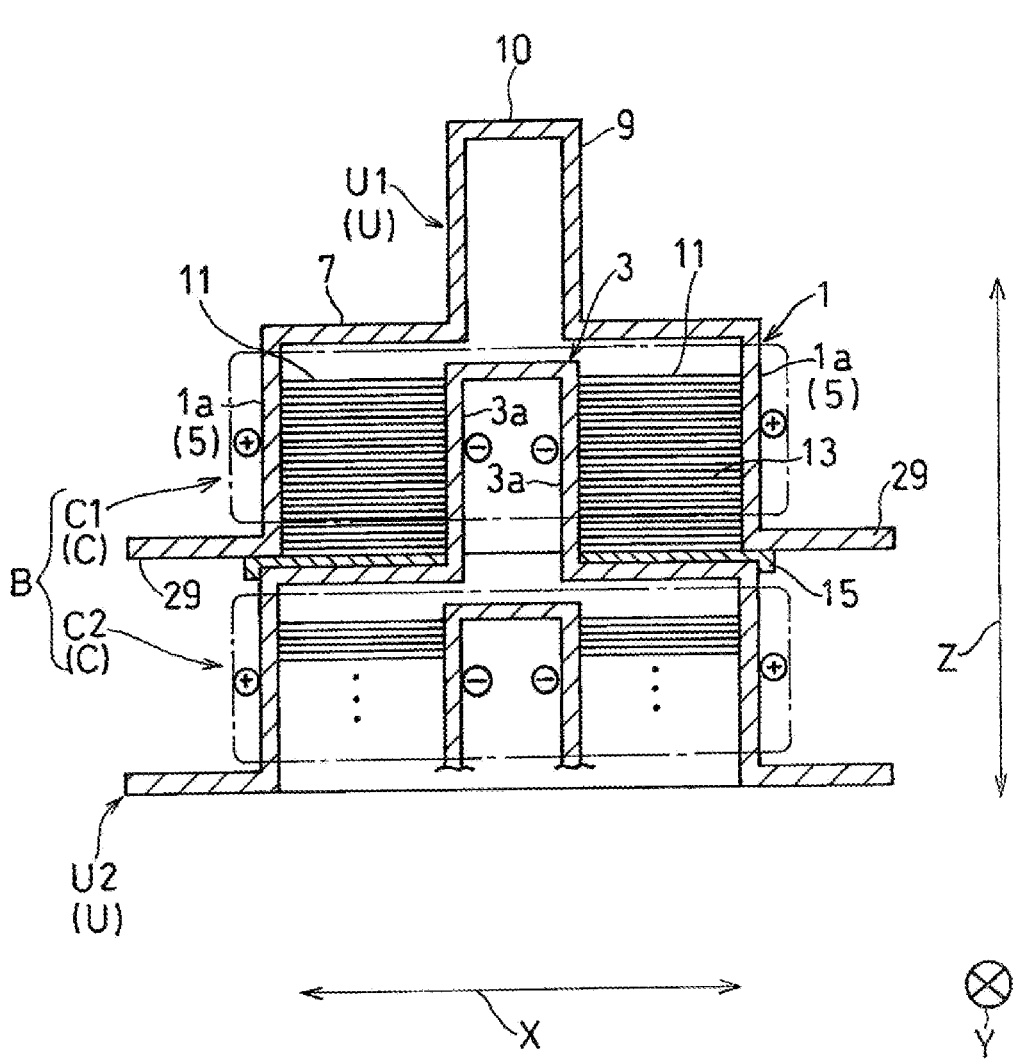
FIG. 1 is a vertical section view that schematically shows a power storage element module including a power storage element according to one embodiment of the present invention.
Figure 2:
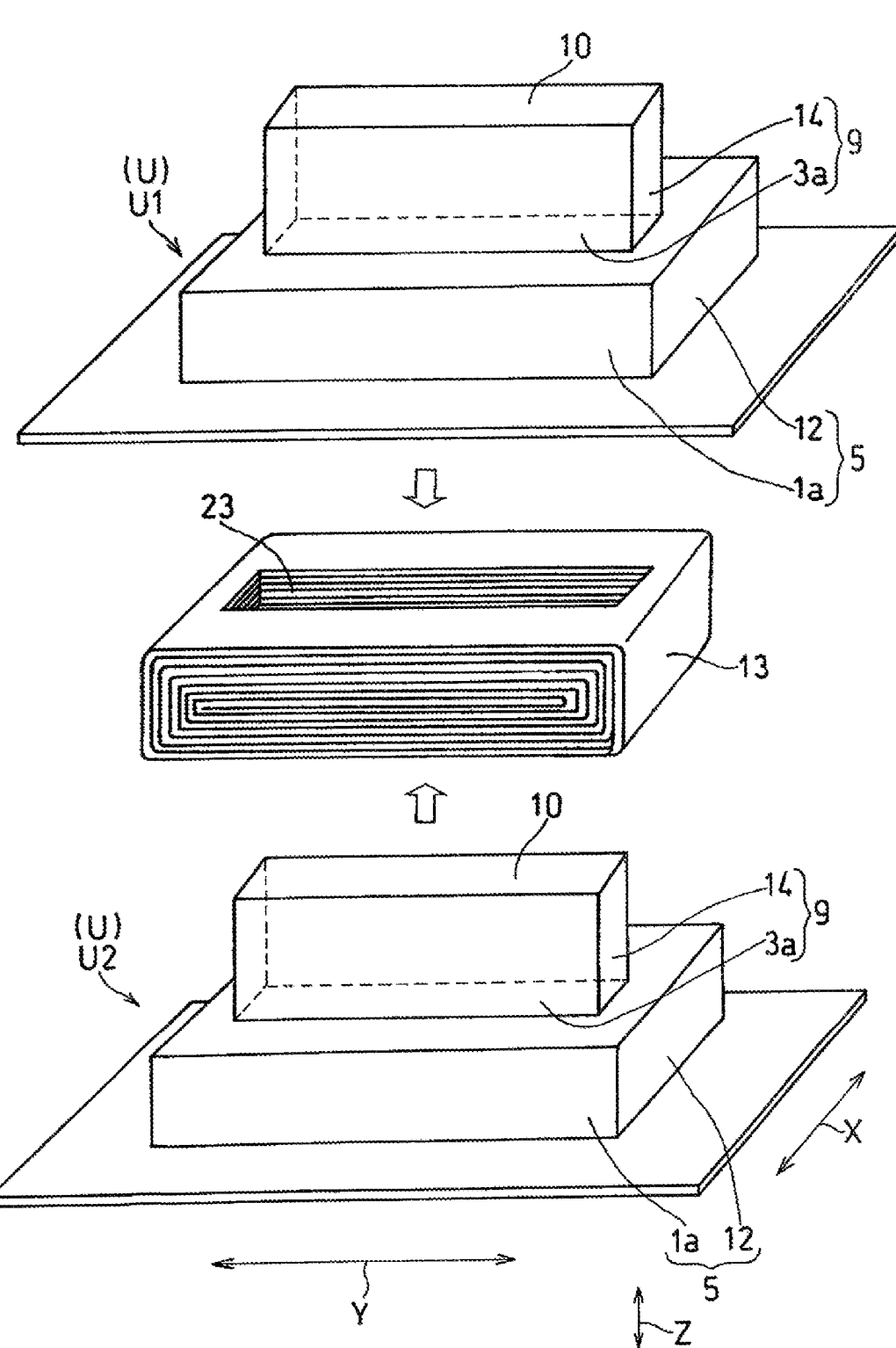
FIG. 2 is an exploded perspective view showing the power storage element module of FIG. 1.

FIG. 1 is a section view schematically showing the structure of a battery module B which is a power storage element module according to one embodiment of the present invention. FIG. 2 is an exploded perspective view showing the battery module B. The battery module B according to this one embodiment includes a plurality of batteries C connected in series, each battery C being a unit battery, i.e., a power storage element. For example, each battery C is a nickel-hydrogen secondary battery including nickel hydroxide as a major positive electrode active material, a hydrogen storage alloy as a major negative electrode active material, and an alkaline aqueous solution as an electrolyte solution.

Figure 3:
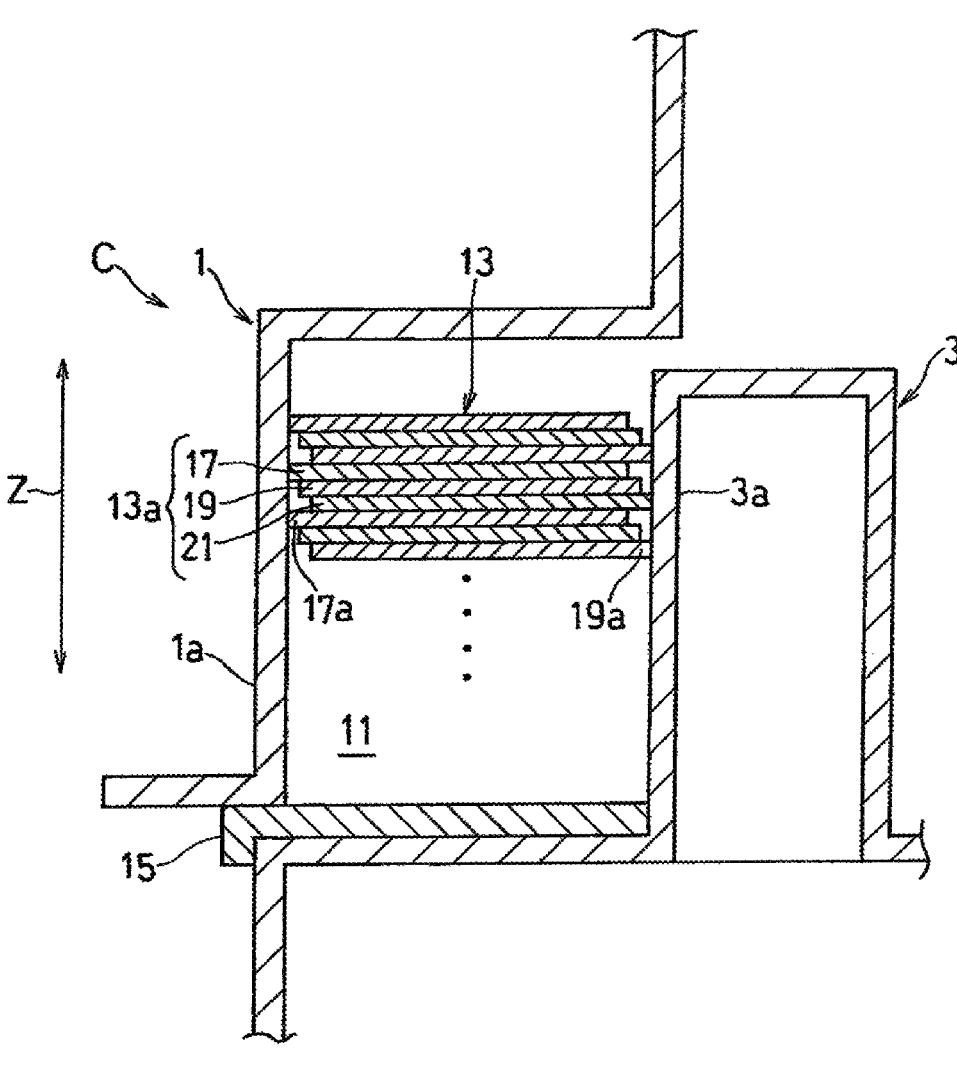
FIG. 3 is a vertical section view showing a main part of the power storage element of FIG. 1 in an enlarged manner.
Figure 3:
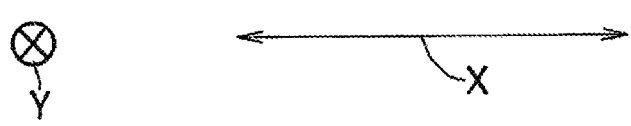

Each battery C includes, as shown in FIG. 3, an electrode member 13 including a plurality of unit electrode layers 13*a* as laminated layers, a positive electrode-side collector connected to respective positive electrode bodies 17 of the unit electrode layers 13*a*, and a negative electrode-side collector connected to respective negative electrode bodies 19 of the unit electrode layers 13*a*.

In the present embodiment, the batteries are physically and electrically connected to one another in a lamination direction Z as described below to constitute the battery module B as shown in FIG. 1. Specifically, in the battery module, two adjacent batteries are electrically connected in series such that the negative electrode-side collector of a first battery C1 of the two batteries C is electrically connected to the positive electrode-side collector of a second battery C2.

Specifically, the negative electrode-side collector of the first battery C1 and the positive electrode-side collector of the second battery C2 are formed in an integrated structure in which these collectors are connected through a connecting part. This allows electrons in the first battery C1 to move into the electrode member 13 of the second battery via the negative electrode-side collector of the first battery, the connecting part, and the positive electrode-side collector of the second battery. The collectors in the present embodiment serve as a connected collector unit U which connects the first battery and the second battery.

In the present embodiment, since the adjacent batteries C have an identical structure, the description mainly focuses on the first battery C1 of the adjacent batteries, and the description of the second battery C2 may be omitted.

As shown in FIG. 1, in the present embodiment, each battery C1 includes an outer collector 1 constituting the positive electrode-side collector and an inner collector 3 constituting the negative electrode-side collector. The outer collector 1 includes a pair of outer opposing walls 1*a* which face each other with a gap therebetween in a predefined opposition direction X. The inner collector 3 includes a pair of inner opposing walls 3*a* which face each other with a gap therebetween in the opposition direction X. The pair of inner opposing walls 3*a* of the inner collector 3 are disposed in an inner region with respect to the pair of outer opposing walls 1*a* in the opposition direction X. In other words, when a battery C1 is viewed in the opposition direction X, the inner opposing walls 3*a* of the battery C1 are located in a position overlapping the outer opposing walls 1*a* of the same battery C1 in a lamination direction Z. To put it another way, the inner opposing walls 3*a* of a battery C1 and the outer opposing walls 1*a* of the same battery C1 are constructed such that these walls can contact the electrode member 13 of the same battery C1.

In the present specification, the opposition direction X in which the thus-arranged pair of outer opposing walls 1*a* face each other is simply referred to as "opposition direction X." In the present specification, the direction in which the unit electrode layers 13*a* are laminated is referred to as "lamination direction Z." The opposition direction X is perpendicular to the lamination direction Z. Further, in the present specification, the direction perpendicular to the opposition direction X and the lamination direction Z is referred to as "extension direction Y."

The electrode member 13 of the battery C1 is disposed in a receiving area 11 including an interwall space 11*a* defined between the pair of outer opposing walls 1*a* and the pair of inner opposing walls 3*a*. The receiving area 11 also receives an electrolyte solution together with the electrode member 13. In this example, the electrode member 13 has a loop shape around an axis extending in the lamination direction Z. Thus, the electrode member 13 is surrounded by the outer opposing walls to face the outer opposing walls in the opposition direction X and in turn surrounds the inner opposing walls 3*a* to face the inner opposing walls 3*a* in the opposition direction X. The electrode member 13 includes, as shown in FIG. 3, the plurality of unit electrode layers 13*a* which are arranged in a laminated manner in the lamination direction Z. The respective unit electrode layers 13*a* are individually in contact with the collectors 1, 3. Specifically, the unit electrode layers 13*a* are in contact with the opposing walls 1*a*, 3*a* facing in the opposition direction X. Thus, the respective unit electrode layers 13*a* are electrically connected to the collectors in parallel. In this way, the respective unit electrode layers 13*a* can contact the outer opposing walls 1 and the inner opposing walls 3*a* of a single battery C1.

As described above, in the present embodiment, the inner collector 3 of the first battery C1 and the outer collector 1 of the second battery C2 of the two adjacent batteries C1, C2 in FIG. 1 are integrated to form the connected collector unit U. In the connected collector unit U, the pair of outer opposing walls 1*a* and the pair of inner opposing walls 3*a* are located in non-overlapping positions in the opposition direction X. In other words, the inner opposing walls 3*a* of a connected collector unit U are arranged at displaced positions from the outer opposing walls 1*a* of the same connected collector unit U in the lamination direction Z. To put it another way, one connected collector unit U can contact an outer part, in the opposition direction X, of the electrode member 13 of a first battery C1 and an inner part, in the opposition direction X, of the electrode member 13 of a second battery C2 of two adjacent batteries C1, C2 in the lamination direction Z.

More specifically, as shown in FIG. 2, the connected collector unit U of the present embodiment includes an outer surrounding wall part 5, an outer surrounding lid part 7, an inner surrounding wall part 9, and an inner surrounding lid part 10. The outer surrounding wall part 5 includes the pair of outer opposing walls 1*a*. The outer surrounding wall part 5 is shaped so as to surround the electrode member 13 at least in the opposition direction X. In the present example, the outer surrounding wall part 5 has a tube shape around an axis extending in the lamination direction Z. The outer surrounding wall part 5 includes the outer opposing walls as described above and a pair of outer connecting walls 12 which connect opposite end portions of the pair of outer opposing walls in the extension direction Y.

In the present embodiment, the outer surrounding wall part 5 has a rectangular tube shape. Each of the pair of outer opposing walls 1*a* has a plate shape extending along a virtual plane perpendicular to the opposition direction X. Each of the pair of outer connecting walls 12 also has a plate shape extending along a virtual plane perpendicular to the extension direction Y. The outer surrounding wall part 5 has a rectangular external shape which has a larger dimension in the extension direction Y than a dimension in the opposition direction X when viewed in the lamination direction Z. In other words, the dimension of the outer opposing walls 1*a* in the extension direction Y is larger than the dimension of the outer connecting walls 12 in the opposition direction X. The outer opposing walls 1*a* have a same dimension in the lamination direction Z as that of the outer connecting walls 12 and a larger dimension in the lamination direction Z than that of the electrode member 13.

The outer surrounding lid part 7 includes a connecting part that connects the outer opposing walls 1*a* and the inner opposing walls 3*a* on one side in the lamination direction Z. The outer surrounding wall part 5 also includes a connecting part that connects the pair of outer opposing walls 1*a* on the one side in the lamination direction Z. In the present example, the outer surrounding lid part 7 has a lid shape covering one side of the outer surrounding wall part 5 in the lamination direction Z. The outer surrounding lid part 7 continuously extends over the entire perimeter part of one end side of the outer surrounding wall part 5 in the lamination direction Z. Thus, the outer surrounding lid part 7 has a rectangular external shape when viewed in the lamination direction Z.

The inner surrounding wall part 9 includes the pair of inner opposing walls 3*a*. The inner surrounding wall part 9 is arranged so as to protrude from the outer surrounding lid part 7 on one side in the lamination direction Z (i.e., on an opposite side to the outer opposing walls 1*a* with respect to the outer surrounding lid part 7). The inner surrounding wall part 9 is shaped so as to be covered by the electrode member 13 at least in the opposition direction X. In the present example, the inner surrounding wall part 9 has a tube shape around an axis extending in the lamination direction Z. The inner surrounding wall part 9 includes the above-described inner opposing walls 3*a* and a pair of inner connecting walls 14 which connect opposite end portions of the pair of inner opposing walls 3*a* in the extension direction Y.

In the present embodiment, the inner surrounding wall part 9 has a rectangular tube shape. Each of the pair of inner opposing walls 3*a* has a plate shape extending along a virtual plane perpendicular to the opposition direction X. Each of the pair of inner connecting walls 14 also has a plate shape extending along a virtual plane perpendicular to the extension direction Y. The inner surrounding wall part 9 has a rectangular external shape which has a larger dimension in the extension direction Y than a dimension in the opposition direction X when viewed in the lamination direction Z. In other words, the dimension of the inner opposing walls 3*a* in the extension direction Y is larger than the dimension of the inner connecting walls 14 in the opposition direction X. The inner opposing walls 3*a* have a same dimension in the lamination direction Z as that of the inner connecting walls 14 and a larger dimension in the lamination direction Z than that of the electrode member 13.

The inner surrounding lid part 10 includes a connecting part that connects the pair of outer opposing walls 1*a* and the inner opposing walls 3*a* on one side in the lamination direction Z. The inner surrounding wall part 9 also includes a connecting part that connects the pair of inner opposing walls 3*a* on the one side in the lamination direction Z. In the present example, the inner surrounding lid part 10 has a lid shape covering one side of the inner surrounding wall part 9 in the lamination direction Z. The inner surrounding lid part 10 continuously extends over the entire perimeter part of one end side of the inner surrounding wall part 9 in the lamination direction Z. Thus, the inner surrounding lid part 10 has a rectangular external shape when viewed in the lamination direction Z. The inner surrounding lid part 10 may have a through hole in the lamination direction Z. This can prevent the receiving space from being tightly closed and thereby avoid the influence of expansion and shrinkage of fluid filling the receiving space due to temperature change.

Thus, in the present embodiment, each of the outer surrounding wall part 5 and the inner surrounding wall part 9 has a substantially rectangular shape when viewed from outside in the lamination direction Z. The inner surrounding wall part 9 constitutes the inner collector 3 of a first battery C1, and the outer surrounding wall part 5 constitutes the outer collector 1 of a second battery C2. It should be noted that although the outer surrounding wall part 5 and the inner surrounding wall part 9 have other mutually opposing walls (outer connecting walls 12 and inner connecting walls 14) than the outer opposing walls 1*a* and inner opposing walls 3*a*, respectively, since they have substantially rectangular tube shapes in the present embodiment, only the walls that can contact the later-described positive electrode bodies 17 and the negative electrode bodies 19 to collect electricity are referred to as "outer opposing walls 1*a*" and "inner opposing walls 3*a*" in this specification.

As shown in FIG. 1, the battery module B is constructed in a stacked manner such that the pair of inner opposing walls 3*a* of a second connected collector unit U2 are arranged on an inner side with respect to the pair of outer opposing walls 1*a* of a first connected collector unit U1 so as to face the outer opposing walls 1*a*. Specifically, the connecting structure of the batteries C is achieved in that the outer opposing walls 1*a* are fitted to an outer side of the electrode member 13, and the inner opposing walls 3*a* are fitted to an inner side of the electrode member 13.

By using the connected collector units U having such construction, a plurality of batteries C can be connected electrically and physically by the connection between the connected collector units U through the electrode member 13. This can consequently omit a member for connecting the batteries C in series, so that it is possible to reduce the size and cost of the battery module B.

In the present embodiment, the receiving area 11 is a space defined by the pair of outer opposing walls 1*a* of the first connected collector unit U1, the outer surrounding lid part 7 of the first connected collector unit U1, the pair of inner opposing walls 3*a* of the second connected collector unit U2, and the outer surrounding lid part 7 of the second connected collector unit U2.

An insulation seal member 15 made of an insulation material may be interposed between the outer collector 1 of the first connected collector unit U1 and the outer collector 1 of the second connected collector unit U2. The insulation seal member 15 secures electrical insulation between the adjacent batteries C. Instead of the insulation seal member, an insulation spacer may be provided so as to prevent contact between the outer collectors.

As shown in FIG. 3, the electrode member 13 is constituted by an electrode laminate 43 (FIG. 7) having a sheet-like shape and including a positive electrode body 17, a negative electrode body 19, and a separator 21 interposed between the positive electrode body 17 and the negative electrode body 19. The electrode member 13 has a continuous form in which the adjacent unit electrode layers 13a in the lamination direction Z are bent at end portions in the extension direction Y. More specifically, the electrode member 13 is shaped by arranging the electrode laminate 43 in winding manner and then shaping the electrode laminate into a flat form with a reduced thickness dimension and a rectangular cross section perpendicular to the opposition direction X.

In the present embodiment, the sheet-like electrode laminate 43 is arranged in a winding manner, so that the electrode member 13 has a rectangular plate-like external shape. The electrode member 13 is disposed such that the thickness direction of the electrode member extends along the lamination direction Z, longer sides of the electrode member on a plane perpendicular to the thickness direction extend along the extension direction Y, and shorter sides of the electrode member on the plane perpendicular to the thickness direction extend along the opposition direction X. The electrode member 13 is disposed such that layer exposing surfaces of the electrode member which expose lamination of the unit electrode layers 13a are directed in the opposition direction X. The layer exposing surfaces of the electrode member 13 serve as outwardly exposed surfaces which come into contact with the outer opposing walls 1a.

The electrode member 13 includes a through hole 23 extending in the thickness direction, i.e., the lamination direction Z and receiving the inner opposing walls 3a in a fitted manner. The through hole 23 is shaped as an elongated hole along the extension direction Y and is located in a middle part of the electrode member 13 in the opposition direction X or specifically at a central position in the opposition direction X. The surfaces of the electrode member 13 which are exposed in the opposition direction X toward the through hole 23 serve as inwardly exposed surfaces which come into contact with the inner opposing walls 3a.

As shown in FIG. 3, each unit electrode layer 13a includes a sheet-like positive electrode body 17, a sheet-like negative electrode body 19, and a sheet-like separator 21 interposed between the positive electrode body 17 and the negative electrode body 19, wherein the positive electrode body, the negative electrode body, and the separator are overlaid in the lamination direction Z and are arranged parallel to the opposition direction X. In the interwall space 11a, the plurality of unit electrode layers 13a are overlaid in the lamination direction Z. In other words, the plurality of unit electrode layers 13a are laminated in the thickness direction of the electrode member 13 (i.e., a height direction of the interwall space 11a or the receiving area 11). In the electrode member 13 having such a construction, the rest part excluding the opposite end portions 13b in the extension direction Y is where the plurality of unit electrode layers 13a are laminated.

As shown in FIG. 3, the positive electrode body 17 includes a positive electrode-body exposing part which is exposed to an outside in the opposition direction X from the rest part of the unit electrode layers 13a. The negative electrode body 19 includes a negative electrode-body exposing part which is exposed to an inside in the opposition direction X from the rest part of the unit electrode layers 13a. In this way, the positive electrode-body exposing part and the negative electrode-body 19 exposing part are exposed to opposite sides, i.e., to the outside and inside, respectively, in the opposition direction X. The positive electrode body 17 is electrically connected to the outer collector 1 by the contact of the positive electrode-body exposing edge part 17a with the outer opposing walls 1a. The negative electrode body 19 is electrically connected to the inner collector 3 by the contact of the negative electrode-body exposing edge part 19a with the inner opposing walls 3a.

Thus, the positive electrode body 17 and the negative electrode body 19 includes the exposing edge parts 17a, 19a, respectively, and the exposing edge parts 17a, 19a are placed in contact with the opposing walls 1a, 3a, so that electrical connection is secured between the electrode member 13 and the respective collectors 1, 3. In other words, the outer opposing walls 1a and the inner opposing walls 3a are fitted to be in contact with the electrode member 13, so that connection between the batteries C and electrical connection between the electrode member 13 and the collectors 1, 3 can be achieved in two steps. This does not require a further separate step for connecting the electrode member 13 and the collectors 1, 3 and thus makes it possible to increase the number of battery modules B that can be manufactured per unit time.

In the electrode member 13, the plurality of unit electrode layers 13a arranged adjacent in the lamination direction Z have parts having a same dimension in the extension direction Y. This can make end faces of the unit electrode layers 13a in the opposition direction X linear. This can facilitate surface contact of the electrode member 13 with the opposing walls and suppress contact failure between the electrode member 13 and the collectors 1, 3. For example, the plurality of unit electrode layers 13a arranged adjacent in the lamination direction Z have parts having a same dimension in the opposition direction X, so that end faces of the collectors 1, 3 in the opposition direction X can be made flat. This can facilitate surface contact of the electrode member 13 with the opposing walls and further suppress contact failure between the electrode member 13 and the collectors 1, 3.

More specifically, each unit electrode layer 13a of the electrode member 13 has a rectangular shape with sides thereof extending in the extension direction Y and in the opposition direction X when viewed in the lamination direction Z (that is, in a plan view). This can increase a volumetric energy density per cubic space and make it easier to increase power that can be outputted. In addition, the outer collector 1 and the inner collector 3 defining the receiving area 11 of the electrode member 13 are also adapted to the shape of the electrode member 13 and have substantially cuboid shapes as described above. Construction of the electrode member 13 and the collectors 1, 3 in such shapes makes it possible to effectively use the space in which the battery C or the battery module B is disposed to prevent the battery from increasing in size.

Figure 4:
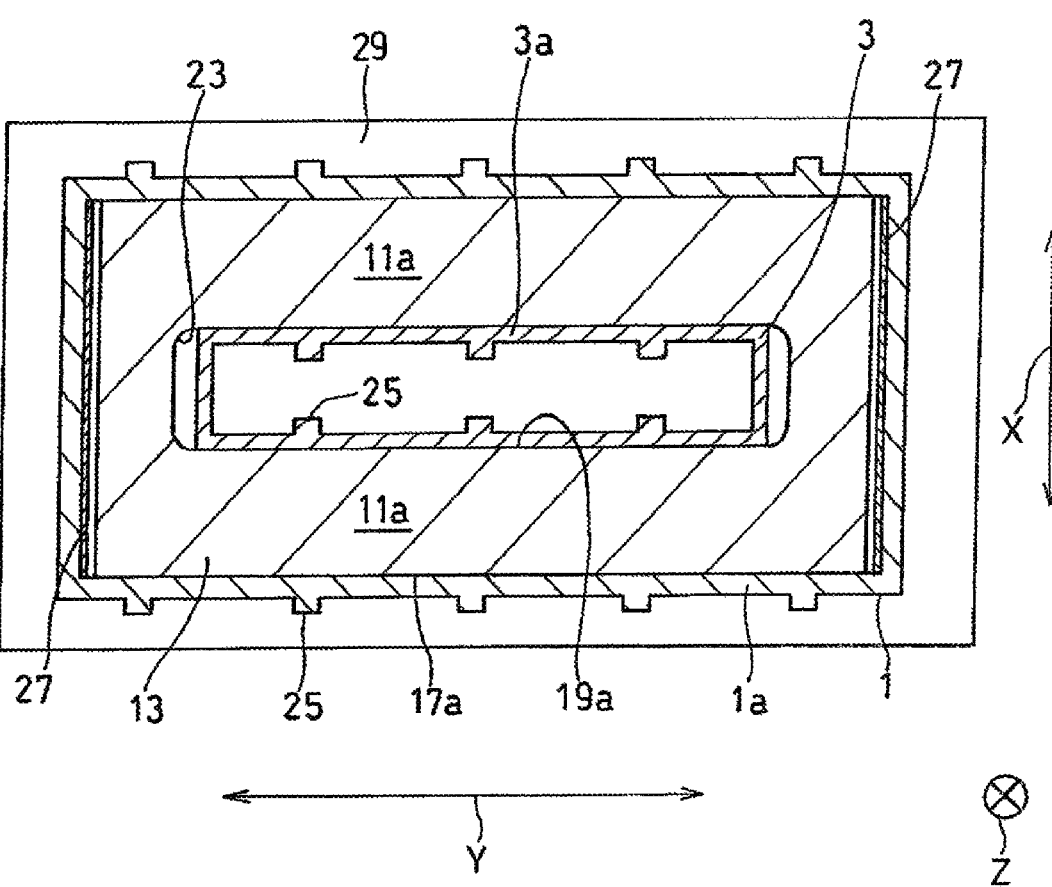
FIG. 4 is a transversal section view showing an internal structure of the power storage element of FIG. 1.

In the present embodiment, the electrode member 13 is shaped such that the surfaces thereof perpendicular to the opposition direction X are larger than the surfaces thereof perpendicular to the extension direction Y. This can increase the areas of the unit electrode layer 13a for contact with the collectors 1, 3 and thereby reduce electrical resistance. Further, the through hole 23 of the electrode member 13 is shaped as an elongated hole along the extension direction Y. As shown in FIG. 4, the through hole 23 has a larger length in the extension direction Y than a length of the inner opposing walls 3a in the extension direction Y. According to this constitution, it is possible to secure a margin for reliably achieving contact with the inner opposing walls 3a against positional displacement occurring in the through hole 23 when the electrode member 13 is bent and thereby to prevent contact failure between the electrode member 13 and the inner opposing walls 3a.

As shown in FIG. 4, the electrode member 13 has a smaller dimension in the opposition direction X than a dimension in the extension direction Y. The smaller dimension of the electrode member 13 in the opposition direction X provides a smaller distance for charged particles to travel within the electrode member 13 to the collectors, so that internal resistance of the battery can be reduced.

In the present embodiment, as described above, the outer opposing walls 1a are formed as a positive electrode collector, and the inner opposing walls 3a are formed as a negative electrode collector. In the battery C of the present embodiment, one of the positive electrode body and the negative electrode body which contacts with the inner opposing walls 3a has a smaller surface area than the other. Therefore, in a case where a more expensive material is used for a negative electrode active material as in the case of the nickel-hydrogen secondary battery of the present embodiment, the inner opposing walls 3a can be used as a negative electrode collector, like in this example, to reduce the raw material costs for the battery as a whole.

In the present embodiment, the electrode member 13 has a winding form and can be produced by winding the positive electrode body 17, the negative electrode body 19 and the separator 21. The electrode member 13 of this type can thus be produced in a shorter time than the time required for the electrode member 13 in a folded form as described later. The electrode member 13 in the winding form can prevent unevenness at the end faces in the extension direction Y.

In the present embodiment, the outer surrounding connecting walls connect the pair of outer opposing walls 1a, so that when the electrode member 13 is fitted, the outer opposing walls 1a can be prevented from deforming in the opposition direction X, which makes it easier to prevent contact failure. Similarly, the outer surrounding lid part 7 connects the pair of outer opposing walls 1a, so that when the electrode member 13 is fitted, the outer opposing walls 1a can be prevented from deforming in the opposition direction X, which makes it easier to prevent contact failure.

The bending parts at the end portions of the electrode member 13 in the extension direction Y are also placed in contact with the outer opposing walls 1a, so that the contact area between the electrode member 13 and the collector can be increased. Further, the electrode member 13 and the collector in the present embodiment make surface contact between their flat surfaces, so that more reliable contact can be achieved than surface contact with curved surfaces.

In the present embodiment, the sheet-like unit electrode layers 13a are constructed so as to continuously extend at the end portions in the extension direction Y. Therefore, the electrode member 13 can be treated as a single unit, so that the unit electrode layers 13a are prevented from delaminating individually in the case of breakdown or degradation, and the electrode member 13 can be easily replaced. When disassembling, it is easy to separate the electrode member into the positive electrode layer, the negative electrode layer, etc., so that recycling processing can be facilitated.

Figure 5:
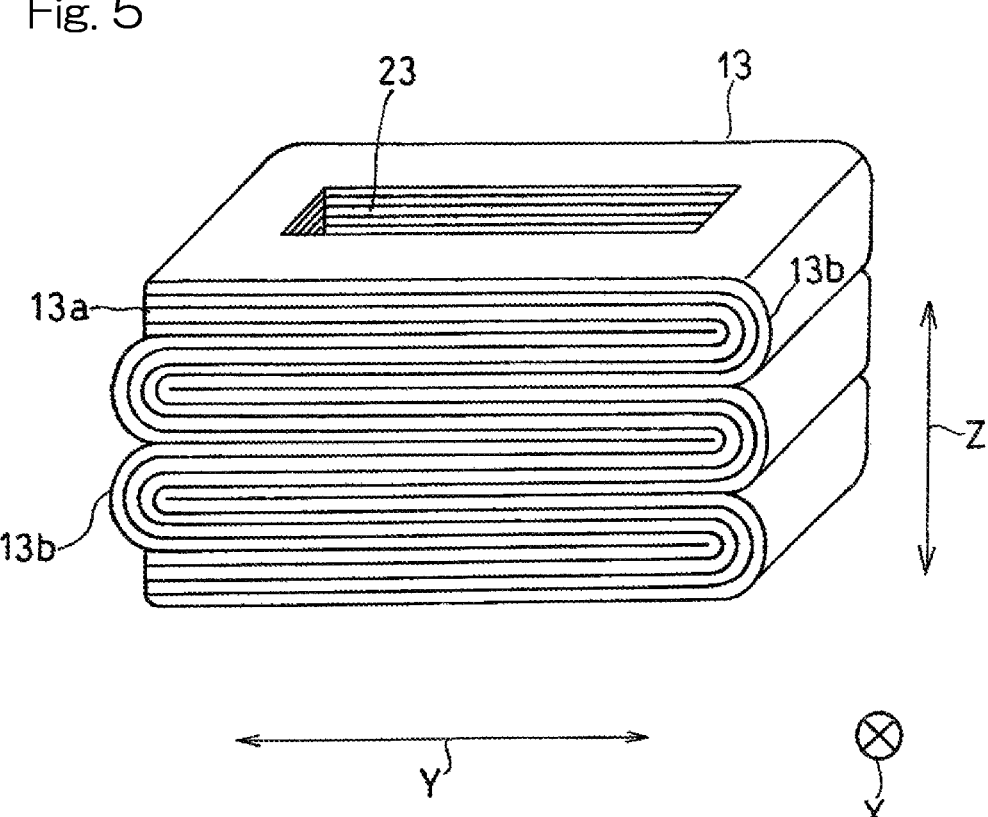
FIG. 5 is a perspective view schematically showing one variant of an electrode member used in the power storage element of FIG. 1.

It should be noted that the specific configuration of the electrode member 13 in the battery C according to the present embodiment is not limited to the winding form as described above. For example, as shown in FIG. 5 as a variant, the electrode member 13 may be constructed such that the above-described electrode laminate 43 (FIG. 7) is folded multiple times in the extension direction, and the positive electrode bodies 17, the negative electrode bodies 19, and the separators 21 of the adjacent unit electrode layers 13a thus continuously extend in a bending manner at the end portions 13b in the extension direction Y. Alternatively, the electrode member 13 may be constructed such that plate-like positive electrode bodies and plate-like negative electrode bodies are alternately arranged as layers between pleats of a separator folded in a pleated manner. In the case of such a folded electrode member 13, the electrode member may also be shaped in a loop form with the through hole 23 extending in the lamination direction Z. The folded structure of the electrode member 13 can make it easier to prevent the electrode member from having an increased size in the extension direction Y, even when the electrode member is repeatedly folded to increase the number of the laminated unit electrode layers 13a.

Although illustration is omitted, the battery C and the battery module B described above may have the following features.

The battery C or the battery module B may be covered by a casing made of an insulation material. The battery module B may include a positive electrode-side terminal and a negative electrode-side terminal for the entire module. The positive electrode-side terminal and the negative electrode-side terminal of the battery module B are connected to the positive electrode collector and the negative electrode collector, respectively, at opposite ends, in the lamination direction Z, of a plurality of batteries C stacked to be connected in series. In the battery module B, a fastener such as a bolt may be used to apply a pressing force to the plurality of batteries C in the lamination direction Z.

The following describes an exemplary method for manufacturing a battery C including the winding type electrode member 13 according to the present embodiment.

The manufacturing method according to the present embodiment includes steps of: providing sheets, laminating, winding, setting exposing edge parts, providing collectors, and assembling a battery.

In the providing the sheets, a positive electrode body 17, a negative electrode body 19, and two separators 21 are provided, each of the positive electrode body, the negative electrode body, and the separators having a strip sheet-like shape.

Figure 6:
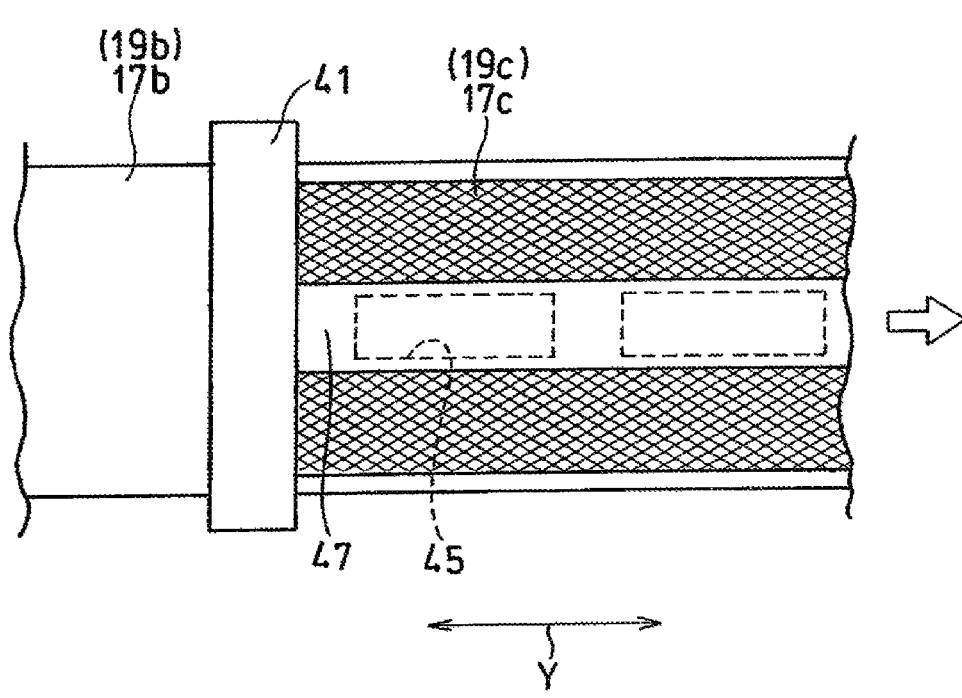
FIG. 6 is a plan view showing one example of a positive electrode (negative electrode) application step included in a step of providing sheets in a method for manufacturing the power storage element of FIG. 1.

More specifically, the providing the sheets includes positive electrode application to apply a positive electrode active material 17c to a positive electrode substrate 17b and negative electrode application to apply a negative electrode active material 19c to a negative electrode substrate 19b, as shown in FIG. 6. Specifically, as shown in FIG. 6, the positive electrode application and the negative electrode application are carried out using an applicator including a doctor blade 41 to continuously spread slurries containing the active materials 17c, 19c on the sheet-like metal substrates 17b, 19b while the substrates are conveyed in the extension direction Y.

Thus, in the battery C according to the present embodiment, the positive electrode body 17 includes the positive electrode substrate 17b made of a conductive material and the positive electrode active material 17c (nickel hydroxide in the present embodiment) applied thereon. The negative electrode body 19 includes the negative electrode substrate 19b made of a conductive plate-like member and the negative electrode active material 19c (hydrogen storage alloy in the present embodiment) applied thereon. The separators 21 (FIG. 2) are constituted by insulating porous films. The separators 21 are impregnated with an electrolyte solution.

Nickel-plated steel plates processed into a foil form are used as the positive electrode substrate 17b and the negative electrode substrate 19b. The material is not limited to nickel-plated steel plates, and a suitable material may be selected considering electrochemical properties, mechanical strength, and corrosion resistance. In addition, different materials may be used for the positive electrode substrate 17b and for the negative electrode substrate 19b.

Materials that may be used to form the separators 21 may include, for example, polyolefin fibers such as polyethylene fibers and polypropylene fibers, polyphenylene sulfide fibers, polyfluoroethylene fibers, polyamide fibers, etc.

The electrolyte solution to impregnate the separators 21 may include an alkaline aqueous solution generally used in a nickel-hydrogen secondary battery, such as a KOH aqueous solution, a NaOH aqueous solution, a LiOH aqueous solution, etc. In particular, it is preferable to use sheet-like separators 21 impregnated with a KOH aqueous solution containing potassium acrylate and having an increased viscosity to form a gel.

In the present embodiment, a polypropylene resin is used as an insulation raw material for forming the insulation seal member 15 shown in FIG. 1. The insulation raw material is not limited to a polypropylene resin and may be selected from various materials in terms of mechanical strength, heat resistance, electrolyte solution resistance, etc.

In the present embodiment, the providing the sheets further includes rolling each of the positive electrode body 17 and the negative electrode body 19. By the rolling, the positive electrode body 17 and the negative electrode body 19 each having a strip sheet-like shape are compressed in the thickness direction and are thereby extended in a widthwise direction. After the rolling, the active materials are less likely to come off from the substrates of the positive electrode body 17 and the negative electrode body 19. The rolling may be performed to only one of the positive electrode body 17 and the negative electrode body 19, or the rolling may be omitted.

Figure 7:
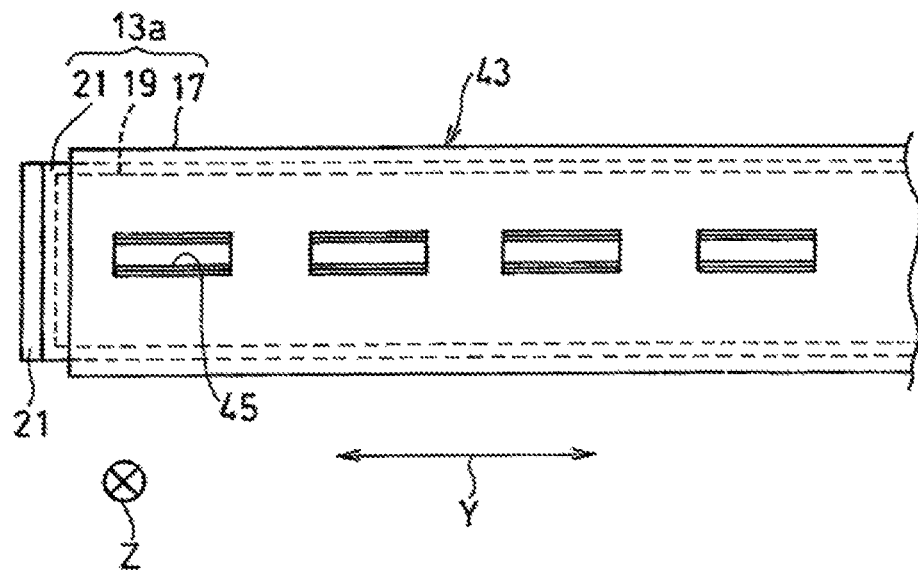
FIG. 7 is a plan view showing an electrode laminate produced in a lamination in the method for manufacturing the power storage element of FIG. 1.

In the laminating, as shown in FIG. 7, a strip-like electrode laminate 43 including a unit electrode layer 13a is formed in which one of the positive electrode body 17 and the negative electrode body 19 is arranged between the two separators 21, and the other of the positive electrode body 17 and the negative electrode body 19 is arranged on an outer side of one of the two separators 21.

In the winding, the strip-like electrode laminate 43 is wound in the extension direction Y to form an electrode member 13 (FIG. 2) including a plurality of unit electrode layers 13a in the lamination direction Z.

In the setting the exposing edge parts, a positive electrode-body exposing edge part 17a and a negative electrode-body exposing edge part 19a are set in the positive electrode body 17 and the negative electrode body 19, respectively, wherein the positive electrode-body exposing edge part and the negative electrode-body exposing edge part are exposed from the electrode member 13 in a direction perpendicular to the lamination direction Z.

In the present embodiment, the setting the exposing edge parts may include exposure processing to the positive electrode body 17, the negative electrode body 19 and the separators 21 or to the electrode laminate 43 so as to form the positive electrode-body exposing edge part and the negative electrode-body exposing edge part before the winding.

More specifically, the exposure processing may include, for example, slit processing. The slit processing forms a plurality of slits 45 penetrating, in the thickness direction, the positive electrode body 17, the negative electrode body 19 and the separators 21 or the electrode laminate 43 at inner positions in the widthwise direction. In the winding, the positive electrode body 17, the negative electrode body 19 and the separators 21 are wound to form a laminate in which the respective slits 45 formed in the respective layers coincide with one another, so that the through hole 23 is formed in the electrode member 13 as shown in FIG. 2.

In a case where the slits 45 are formed in the positive electrode body 17, the negative electrode body 19 and the separators 21 in the slit processing, the positive electrode application and the negative electrode application include continuously applying the positive electrode active material 17c and the negative electrode active material 19c, respectively, in the extension direction Y to a non-slit area excluding a slit area 47 where the slits 45 are to be formed in the slit processing as shown in FIG. 6. Specifically, in the present embodiment, the slits shown with dashed lines in FIG. 5 are to be formed at the central part in the positive electrode body 17 in the widthwise direction. The positive electrode active material 17e is continuously applied in the extension direction Y to a widthwise range from positions slightly away from opposite sides of the slit area 47 in the widthwise direction to positions leaving opposite outer edge portions, within the area other than the slit area 47 where the slits 45 are to be formed in the positive electrode body 17. In the negative electrode application, the negative electrode active material 19c is also continuously applied to substantially the same area.

Since, in the present embodiment, the positive electrode body 17 is in contact with the outer opposing walls 1a and the negative electrode body 19 is in contact with the inner opposing walls 3a in a finished battery C as described above, the width of the positive electrode body 17 is larger than the width of the negative electrode body 19. Further, the width of the slit area 47 in the positive electrode body 17 is larger than the width of the slit area 47 in the negative electrode body 19. The width of the separators 21 is between the width of the positive electrode body 17 and the width of the negative electrode body 19, and the width of the slits in the separators 21 is between the width of the slits in the positive electrode body 17 and the width of the slits in the negative electrode body 19. Such dimensions of the positive electrode body 17, the negative electrode body 19 and the separators 21 allow the positive electrode-body exposing edge part 17a and the negative electrode-body exposing edge part 19a to be formed when they are wound such that the centers in the widthwise direction in these layers are aligned. The exposure processing includes such dimensioning of the positive electrode body 17, the negative electrode body 19 and the separators 21 including the slits 45.

In a case where the slit processing is carried out before the winding in this way, the intervals between the plurality of slits 45 in the extension direction Y is set, considering that the dimension of the electrode member 13 will increase in the extension direction Y due to repeated winding.

In a case where the positive electrode-body exposing edge part 17a and the negative electrode-body exposing edge part 19a are set in this manner, the respective exposing edge parts 17a, 19a are formed so as to extend in the extension direction Y (longitudinal direction) perpendicular to the widthwise direction in the positive electrode body 17 and the negative electrode body 19 each having a strip-like shape. In a case where the providing the sheets further includes the rolling as described above, the respective exposing edge parts 17a, 19a extend perpendicular to a rolling direction that corresponds to the widthwise direction (opposition direction X). Rolling the positive electrode body 17 and/or the negative electrode body 19 makes it possible to set the extension direction of the exposing edge parts in the positive electrode body 17 and the negative electrode body 19 perpendicular to the compression direction and to use the exposing edge parts 17a, 19a that are set in such a manner to collect electricity so as to reduce cracks on the surfaces of the positive electrode body 17 and the negative electrode body 19 and/or influence of resistance increase possibly occurring due to the rolling.

After the positive electrode application and the negative electrode application, the above-described slit processing is carried out.

The providing the collectors provides, as shown in FIG. 1, the outer collector 1 including the pair of outer opposing walls 1a, 1a facing each other with a gap therebetween and the inner collector 3 disposed on an inner side with respect to the pair of outer opposing walls 1a, 1a and including the pair of inner opposing walls 3a, 3a facing each other with a gap therebetween in the opposition direction X of the pair of outer opposing walls 1a, 1a.

The metal material(s) forming the outer collector 1 and the inner collector 3 is selected so as to permit stable use for a long period of time, considering electrochemical properties and the like of the active materials of the positive electrode and the negative electrode with which the respective collectors are placed in contact to collect electricity. For example, where the battery C is a nickel-hydrogen secondary battery as in the present embodiment, both the outer collector 1 and the inner collector 3 may be constituted by, for example, a nickel-plated steel plate. However, where the battery C is a lithium-ion secondary battery, for example, a collector that serves as a positive electrode-side collector (outer collector 1 in the present embodiment) may be constituted by an aluminum plate, and a collector that serves as a negative electrode-side collector (inner collector 3 in the present embodiment) may be constituted by a copper plate or a nickel-plated steel plate.

In the present embodiment, in the providing the collectors, more specifically, a plurality of connected collector units U are produced as shown in FIG. 1. Where both the outer collector 1 and the inner collector 3 are made of the same material, e.g., constituted by a nickel-plated steel plate as described above, for example, the nickel-plated steel plate is press-formed into a connected collector unit U. Where the outer collector 1 and the inner collector 3 are made of different materials, e.g., constituted by an aluminum plate and a copper plate, respectively, these plate materials in an overlaid state are press-formed into a connected collector unit U.

In the assembling the battery, the electrode member 13, the outer collector 1 and the inner collector 3 are put together such that the positive electrode-body exposing edge part 17a is placed in contact with either the outer opposing walls 1a or the inner opposing walls 3a, and the negative electrode-body exposing edge part 19a is placed in contact with the other of the outer opposing walls 1a and the inner opposing walls 3a.

Following the assembling the battery, solution injection is carried out to inject the electrolyte solution into the receiving area 11. The electrolyte solution is injected, for example, through a solution injection hole (not illustrated) in a top wall of the protruding wall part 9.

In the battery C according to the present embodiment, the respective surfaces of the outer opposing walls 1a and the inner opposing walls 3a with which the electrode member 13 is in contact may preferably include irregularities which prevent positional displacement of the positive electrode body 17 and the negative electrode body 19. More specifically, inner peripheral surfaces of the outer opposing walls 1a and outer peripheral surfaces of the inner opposing walls 3a are formed as course surfaces with fine irregularities. Such irregularities can be formed by, for example, composite plating or multistage pressing. This constitution can prevent positional displacement of the electrode member 13 with respect to the collectors and prevent contact failure between the collectors and the electrode layers. It should be noted that the irregularities for preventing positional displacement may be provided on either the outer opposing walls 1a or the inner opposing walls 3a only or be omitted.

As shown in FIG. 4, in the present embodiment, each of the collectors 1, 3 may include a reinforcing mechanism which prevents deformation in the opposition direction X. More specifically, as the reinforcing mechanism, the opposing walls may include a plurality of reinforcing ribs 25 extending in a direction perpendicular to the extension direction Y at equal intervals on the surfaces that do not contact with the positive electrode body 17 or the negative electrode body 19, i.e., on outer peripheral surfaces of the outer opposing walls 1a and inner peripheral surfaces of the inner opposing walls 3a. This constitution can prevent deformation of the respective opposing walls 1a, 3a, so that deformation of the outer opposing walls 1a and the inner opposing walls 3a can be prevented to avoid contact failure due to such deformation. The reinforcing mechanism may be provided on either the outer opposing walls 1a or the inner opposing walls 3a only or be omitted. The specific constitution of the reinforcing mechanism is not limited to the reinforcing ribs 25 of this example.

In the present embodiment, an insulation material 27 may cover an area of the outer collector 1 other than the area that contacts with the positive electrode body 17 in a connected state, i.e., an area of inner peripheral surfaces of the outer surrounding wall part 5 other than the inner peripheral surfaces of the outer opposing walls 1a in the illustrated example. As an alternative to or in addition to the above area of the outer collector 1, an insulation material 27 may cover an area of the inner collector 3 other than the area that contacts with the negative electrode body 19 in a connected state, i.e., an area of outer peripheral surfaces of the protruding wall part 9 other than the outer peripheral surfaces of the inner opposing walls 3a. Covering the collectors 1, 3 in this manner can prevent short circuiting between the electrode member 13 and the respective collectors 1, 3.

Figure 8:
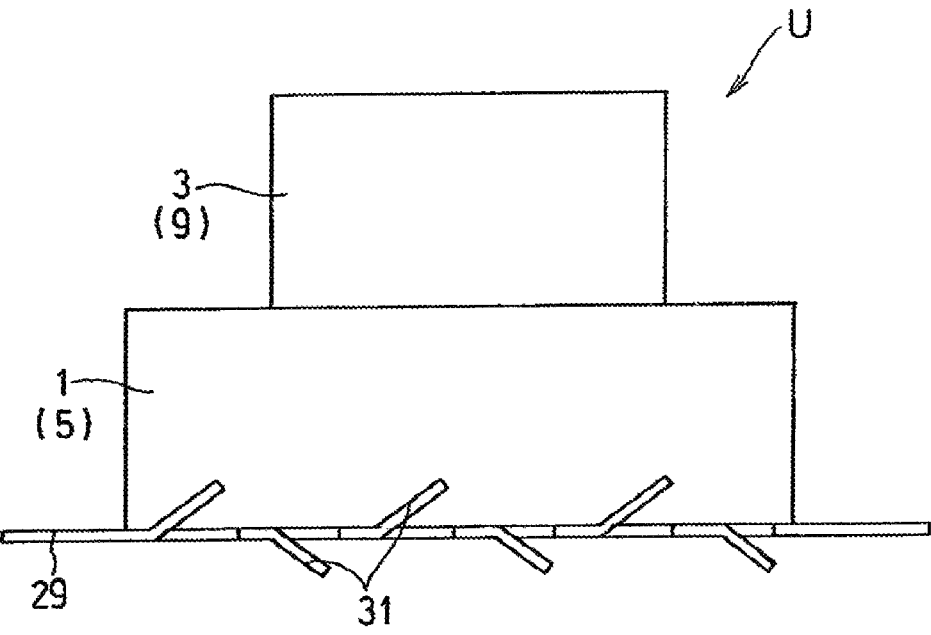
FIG. 8 is a side view schematically showing a variant of the power storage element of FIG. 1 which includes heat dissipation fins on a flange.

In the present embodiment, as shown in FIG. 1 and FIG. 4, a flange 29 is provided at an opening-side edge portion of the outer collector 1. Where the flange 29 is provided, the edge serves as a cooling fin so as to improve heat dissipation property of the connected collector unit U including the outer collector 1 and suppress temperature increase in the battery C during charging and discharging. Further, as shown in FIG. 8 as a variant, a part of the flange 29 may be cut and bent to provide heat dissipation fins 31. The shape, number, and positions of the heat dissipation fins 31 are not limited to those of the illustrated example. The flange 29, however, may be omitted. Where the flange 29 is omitted, the battery module B constituted by the battery C as a whole has a smaller dimension, so that the volumetric energy density can be improved.

Figure 9:
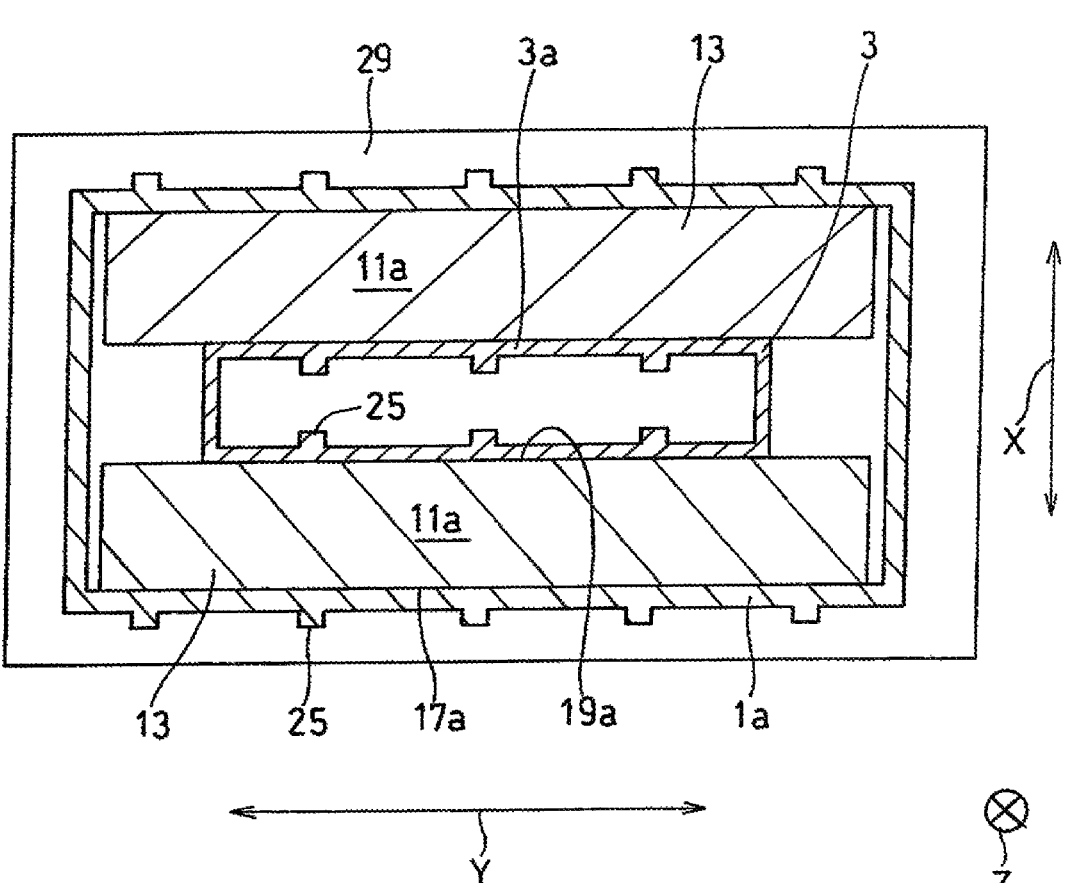
FIG. 9 is a transversal section view showing one variant arrangement of the electrode member in the power storage element of FIG. 1.

In the present embodiment, as shown in FIG. 2, the single electrode member 13 includes the through hole 23. The arrangement of the electrode member 13 in the receiving area 11, however, is not limited to that of the above example. For instance, as shown in FIG. 9 as a variant, two separate electrode members 13 may be arranged separately in a pair of interwall spaces 11a. In other words, the electrode members 13 may be arranged in areas excluding outside of the through hole 23 in the extension direction Y. Further, it is not necessary to arrange an electrode member 13 in each of the pair of interwall spaces 11a, and an electrode member 13 may be arranged only one of the interwall spaces 11a in the receiving area.

In a case where the single electrode member 13 includes the through hole 23, the number of the through hole 23 is not limited to one, and there may be a plurality of through holes 23 in the extension direction Y. In such a case, the inner opposing walls 3a, 3a are arranged intermittently in the extension direction Y according to the number and the positions of the plurality of through holes 23 in the electrode member 13. Provision of the plurality of through holes 23 in such a manner makes it easy to prevent positional displacement of the electrode member 13 in the extension direction Y.

Figure 10:
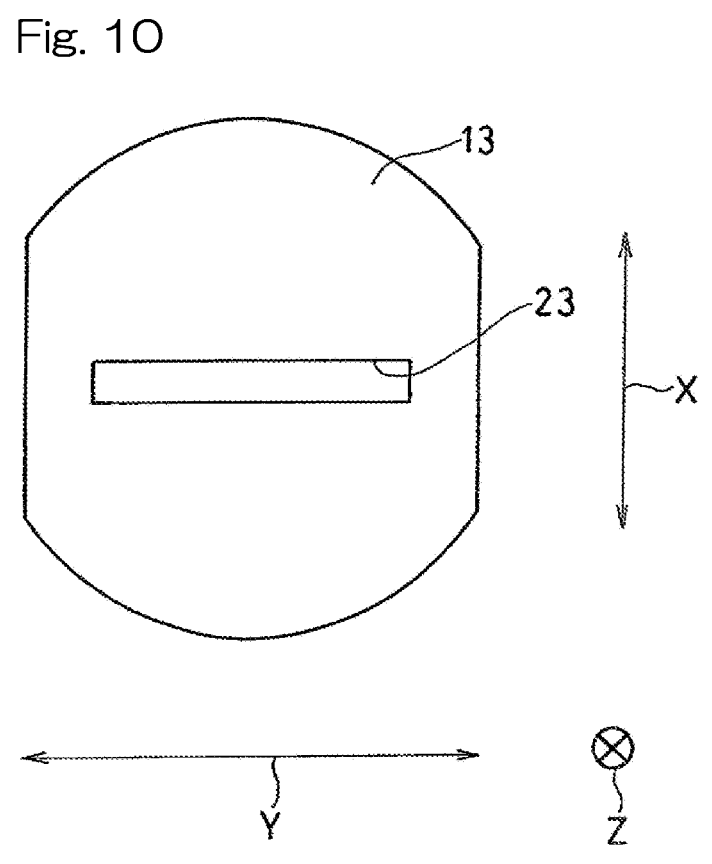

The present embodiment has been described with reference to an example in which the electrode member 13 has a substantially rectangular shape in a plan view, and correspondingly, the outer collector 1 and the inner collector 3 also have substantially rectangular shapes in a plan view. However, the shape of the electrode member 13 is not limited to that of the above example, as long as the positive electrode bodies 17, the negative electrode bodies 19 and the separators 21 in the adjacent unit electrode layers 13a continuously extend in a bending manner at the end portions 13b in the extension direction Y. For example, the electrode member may have a substantially round shape in a plan view as shown in FIG. 10.

In the present embodiment, the outer collector 1 serves as a positive electrode-side collector, and the inner collector 3 serves as a negative electrode-side collector. However, the positive electrode side and the negative electrode side may be switched such that the outer collector 1 serves as a negative electrode-side collector, and the inner collector 3 serves as a positive electrode-side collector.

The present embodiment has been described with reference to an example in which a plurality of batteries C1, C2 are connected in series to constitute a battery module B. However, it is not necessary to take the form of a battery module B, and a single battery C may be used solely. In such a case, the effects described for the present embodiment can also be obtained.

The shapes of the outer surrounding wall part 5 and the inner surrounding wall part 9 described in the present embodiment are mere examples, and other shapes may be used. For example, the outer surrounding wall part 5 and/or the inner surrounding wall part 9 may partially define a through hole 23, or may be absent in some parts to form an intermittent structure. In the present embodiment, the outer surrounding wall part 5 and the inner surrounding wall part 9 are constituted by walls extending parallel along the lamination direction Z. However, these walls may be tapered so as to incline in the opposition direction X as they extend in the lamination direction Z.

The present invention encompasses not only the battery and the battery module B, but also an electrode member 13 having the above constitution.

According to the battery C of the above embodiment and the manufacturing method therefor, connection of a plurality of batteries C in series can be easily and compactly achieved by integrally shaping or electrically connecting the outer collector 1 of a first battery C and the inner collector 3 of a second battery. Use of the electrode member 13 having a bending structure, e.g., an electrode member 13 having a winding structure, in which the unit electrode layers 13a continuously extend at the end portions 13b in the extension direction Y in a battery C having such a collecting structure can eliminate the necessity of cutting sheet bodies depending on the number of the unit electrode layers 13a and reduce the number of components in assemblage of the battery. Further, this does not require operations of cutting sheet bodies and arranging the cut sheet bodies in a layered structure, so that the number of operations can be reduced. In this way, it is possible to increase the number of electrode members 13 that can be manufactured per unit time.

The battery module B according to the above embodiment is described with reference to an example in which the battery C is a nickel-hydrogen secondary battery. The present invention, however, is not limited to such a case and be applied to various primary batteries and secondary batteries, such as nickel-cadmium secondary batteries and lithium-ion secondary batteries.

In the above embodiment, a battery is referred to as an example of a power storage element. The present invention, however, can also be applied to power storage elements other than batteries, such as lithium-ion capacitors.

Although the present invention has been described in terms of the preferred embodiments thereof with reference to the drawings, various additions, modifications, or deletions may be made without departing from the scope of the invention. Accordingly, such variants are included within the scope of the present invention.

REFERENCE NUMERALS

1 . . . outer collector
1a . . . outer opposing wall
3 . . . inner collector
3a . . . inner opposing wall
13 . . . electrode member
13a . . . unit electrode layer
17 . . . positive electrode body
17a . . . positive electrode-body exposing edge part
19 . . . negative electrode body
19a . . . negative electrode-body exposing edge part
21 . . . separator
23 . . . through hole
43 . . . electrode laminate
B . . . battery module (power storage element module)
C . . . battery (power storage element)
U . . . connected collector unit
X . . . opposition direction
Y . . . extension direction
Z . . . lamination direction

What is claimed is:

1. A power storage element comprising:
an outer collector including a pair of outer opposing walls facing each other with a gap therebetween in a predefined opposition direction,
an inner collector disposed on an inner side with respect to the pair of outer opposing walls in the opposition direction and including a pair of inner opposing walls facing each other with a gap therebetween in the opposition direction, and an electrode member disposed in a space defined between the pair of outer opposing walls and the pair of inner opposing walls, wherein the electrode member includes:

an electrode laminate having a sheet-like shape and including a positive electrode body, a negative electrode body, and a separator interposed between the positive electrode body and the negative electrode body, the electrode laminate forming a plurality of unit electrode layers laminated in a predefined lamination direction perpendicular to the opposition direction, and adjacent unit electrode layers in the lamination direction are continued in a bending manner at end portions of the unit electrode layers in an extension direction perpendicular to the opposition direction and the lamination direction, respective positive electrode bodies constituting the unit electrode layers and laminated in the lamination direction are in contact with a first collector, which is one of the outer collector and the inner collector, to be electrically connected to the first collector, and respective negative electrode bodies constituting the unit electrode layers and laminated in the lamination direction are in contact with a second collector, which is the other of the outer collector and the inner collector, to be electrically connected to the second collector, the electrode member includes a through hole penetrating the electrode member in the lamination direction of the unit electrode layers and receiving the inner opposing walls in a fitted manner, the through hole is shaped as an elongated hole along the extension direction, and the through hole has a larger length in the extension direction than a length of the inner opposing walls in the extension direction.

2. The power storage element as claimed in claim 1, wherein an inner portion of the electrode member in the opposition direction, the inner portion facing the through hole, is electrically connected to the inner collector, and an outer portion of the electrode member in the opposition direction is electrically connected to the outer collector.

3. The power storage element as claimed in claim 2, wherein in the electrode member, the electrode laminate having the sheet-like shape is wound or folded such that the electrode laminate is bent at opposite end portions thereof in the extension direction to form the plurality of unit electrode layers.

4. The power storage element as claimed in claim 1, wherein at least one of the positive electrode body and the negative electrode body constituting each unit electrode layer is in contact with both of a pair of opposing walls in the opposition direction to be electrically connected to a corresponding collector.

5. The power storage element as claimed in claim 1, wherein the unit electrode layers of the electrode member include parts having a same dimension in the opposition direction over a predetermined range in the extension direction.

6. The power storage element as claimed in claim 1, wherein each of the unit electrode layers of the electrode member has a rectangular shape with sides thereof extending in the extension direction and in the opposition direction when viewed in the lamination direction.

7. The power storage element as claimed in claim 1, wherein at least one of the outer opposing walls and the inner opposing walls includes irregularities which prevent positional displacement of the electrode member in contact therewith.

8. The power storage element as claimed in claim 1, wherein at least one of the outer opposing walls and the inner opposing walls include a reinforcing mechanism which prevents deformation in the opposition direction.

9. A power storage element module comprising a plurality of the power storage elements as claimed in claim 2, the power storage elements being connected in series, wherein the power storage element module includes a connected collector unit including an outer collector of a first power storage element integrally formed with an inner collector of a second power storage element, the first and second power storage elements being adjacent in the lamination direction, the connected collector unit has a connection structure in which the first and second power storage elements adjacent in the lamination direction are connected in a fitted manner.

10. The power storage element as claimed in claim 2, wherein insulation material covers portions of the outer collector other than inner peripheral surfaces of the outer opposing walls that are in contact with the positive electrode bodies or the negative electrode bodies.

11. A method of manufacturing a power storage element, the method comprising:

providing sheets of a positive electrode body, a negative electrode body, and two separators;

laminating the sheets, each having slits that penetrate in a thickness direction, to form a sheet-like electrode laminate including a unit electrode layer in which one of the positive electrode body and the negative electrode body is arranged between the two separators, and the other of the positive electrode body and the negative electrode body is arranged on an outer side of one of the two separators;

winding the electrode laminate in an extension direction of the electrode laminate to form an electrode member including a plurality of unit electrode layers laminated in a lamination direction, wherein the slits of the respective sheets of the plurality of unit electrode layers in the electrode member are aligned to form a through hole penetrating in the lamination direction;

setting a positive electrode-body exposing edge part and a negative electrode-body exposing edge part in the positive electrode body and the negative electrode body, respectively, wherein the positive electrode-body exposing edge part and the negative electrode-body exposing edge part are exposed from the electrode member in an opposition direction perpendicular to the lamination direction and the extension direction;

providing an outer collector including a pair of outer opposing walls facing each other with a gap therebetween and an inner collector disposed on an inner side with respect to the pair of outer opposing walls and including a pair of inner opposing walls facing each other with a gap therebetween in the opposition direction of the pair of outer opposing walls; and assembling the power storage element such that the positive electrode-body exposing edge part is placed in electrical contact with one of the pair of outer opposing walls and the pair of inner opposing walls, and the negative electrode-body exposing edge part is placed in electrical contact with the other of the pair of outer opposing walls and the pair of inner opposing walls to put together the electrode member, the outer collector, and the inner collector, wherein in the power storage element, the through hole receives the inner opposing walls in a fitted manner, the through hole is shaped as an elongated hole along the extension direction, and the through hole has a larger length in the extension direction than a length of the inner opposing walls in the extension direction.

12. The method as claimed in claim 11, wherein the setting the exposing edge parts includes exposure processing to the positive electrode body, the negative electrode body and the separators or to the electrode laminate so as to form the positive electrode-body exposing edge part and the negative electrode-body exposing edge part before the winding.

13. The method as claimed in claim 12, wherein the exposure processing includes slit processing to form a slit penetrating, in a thickness direction, the positive electrode body, the negative electrode body and the separators or the electrode laminate at inner positions in a widthwise direction thereof, and the providing the sheets includes positive electrode application to apply a positive electrode active material to a positive electrode metal substrate and negative electrode application to apply a negative electrode active material to a negative electrode metal substrate, and the positive electrode application and the negative electrode application include continuously applying the positive electrode active material and the negative electrode active material, respectively, in the extension direction to a non-slit area excluding a slit area where the slit is to be formed in the slit processing.

14. The method as claimed in claim 13, wherein the slit processing is carried out after the positive electrode application and the negative electrode application.

15. The method as claimed in claim 13, wherein the slit processing includes forming a slit in each of the positive electrode body, the negative electrode body, and the separators during the providing the sheets, and the providing the sheets includes forming the slit having a larger widthwise dimension in one of the positive electrode body and the negative electrode body than a widthwise dimension of the slit in the other of the positive electrode body and the negative electrode body, and making a widthwise dimension of the other of the positive electrode body and the negative electrode body larger than a widthwise dimension of the one of the positive electrode body and the negative electrode body.

16. The method as claimed in claim 11, wherein the providing the sheets includes rolling at least one of the positive electrode body and the negative electrode body, and the setting the exposing edge parts includes setting, in the rolled positive electrode body and/or the rolled negative electrode body, the positive electrode-body exposing edge part and/or the negative electrode-body exposing edge part so as to extend along a direction perpendicular to a rolling direction.

* * * * *